(12) United States Patent
Dasylva et al.

(10) Patent No.: US 7,106,977 B1
(45) Date of Patent: Sep. 12, 2006

(54) TECHNIQUE FOR MULTICASTING OPTICAL FREQUENCY CHANNELS IN A MULTI-CHANNEL OPTICAL SYSTEM

(75) Inventors: Abel C. Dasylva, Ottawa (CA); Delfin Y. Montuno, Kanata (CA)

(73) Assignee: Nortel Networks Limited, St. Laurent ( * ) Notice: Subject to any disclaimer, the term of this patent is extended or adjusted under 35 U.S.C. 154(b) by 885 days.

(21) Appl. No.: 10/303,015

(22) Filed: Nov. 25, 2002

Related U.S. Application Data

(63) Continuation-in-part of application No. 09/749,946, filed on Dec. 29, 2000, now Pat. No. 7,010,225.

(51) Int. Cl.
*H04B 10/00* (2006.01)
(52) U.S. Cl. .............. 398/182; 398/49; 398/66
(58) Field of Classification Search ............ 398/43, 398/49, 66, 79–89, 182–201
See application file for complete search history.

(56) References Cited

U.S. PATENT DOCUMENTS 5,825,517 A   10/1998   Antoniades et al. ........ 359/117

OTHER PUBLICATIONS

B. Ramamurthy, and B Mukherjee, "Wavelength-conversion in WDM networking", IEEE Journal on Selected Areas on Communications, vol. 16, pp. 1061-1073, Sep. 1998.
S. Yoo, "Wavelength-conversion technologies for WDM network applications", IEEE Journal of Lightwave Technology, vol. 14, pp. 955-966, Jun. 1996.
K. Lee, and V. Li, "A frequency-convertible optical network", IEEE Journal of Lightwave Technology, vol. 11, pp. 962-970, May-Jun. 1993.
K. Lee, and V. Li, "Optimization of a WDM optical packet switch with wavelength-converters", in Proceedings of IEEE INFOCOM '95, vol. 2, pp. 423-430, Apr. 1995.
N. Antoniades, S. Yoo, K. Bala, G. Ellinas, and T. Stern, "An architecture for a wavelength-interchanging cross-connect utilizing parametric frequency-converters", IEEE Journal of Lightwave Technology, vol. 17, pp. 113-1125, Jul. 1999.
R. Thompson, and D. Hunter, "Elementary photonic switching modules in three divisions", IEEE Journal on Selected Areas in Communications, vol. 14, pp. 362-373, Feb. 1996.
D. Shyy, and C. Lea, "$Log_2(N,m,p)$ strictly nonblocking networks", IEEE Transactions on Communications, vol. 39, pp. 1502-1510, Oct. 1991.
C.T. Lea, "Tradeoff of horizontal decomposition versus vertical stacking in rearrangeable nonblocking networks", IEEE Transactions on Commuications, vol. 39, No. 6, Jun. 1991.

*Primary Examiner*—Agustin Bello
(74) *Attorney, Agent, or Firm*—Hunton & Williams LLP

(57) ABSTRACT

A technique for multicasting an optical frequency channel in a multi-channel optical system is disclosed. In one particular exemplary embodiment, the technique may be realized as a method for multicasting an optical frequency channel in a multi-channel optical system. The method comprises splitting a first optical frequency channel in a pair of adjacent optical frequency channels into a first split optical frequency channel and a second split optical frequency channel. The method also comprises converting the optical frequency of the second split optical frequency channel to the optical frequency of the second optical frequency channel in the pair of adjacent optical frequency channels. The method further comprises selectively directing the first split optical frequency channel and the converted second split optical frequency channel to separate destinations.

14 Claims, 7 Drawing Sheets

US 7,106,977 B1

TECHNIQUE FOR MULTICASTING OPTICAL FREQUENCY CHANNELS IN A MULTI-CHANNEL OPTICAL SYSTEM

CROSS-REFERENCE TO RELATED APPLICATIONS

This patent application is a continuation-in-part patent application of U.S. patent application Ser. No. 09/749,946, filed Dec. 29, 2000, now U.S. Pat. No. 7,010,225, which is hereby incorporated by reference herein in its entirety.

FIELD OF THE INVENTION

The present invention relates generally to routing optical channels and, more particularly, to a technique for multicasting an optical frequency channel in a multi-channel optical system.

BACKGROUND OF THE INVENTION

Multicast, or one-to-many, communications are important for supporting emerging distributed applications. In photonic space-switched networks, multicast communications can be easily and cost-effectively implemented with optical splitters. However, in multi-wavelength photonic networks, multicast switching requires wavelength converters to allow a channel at a distinct optical frequency to be broadcast to other channels at other distinct optical frequencies. Such photonic wavelength converters are expensive, and thus it is preferable to minimize the number of photonic converters in a network.

To date, there has been little work performed on photonic multicast switches having wavelength conversion capabilities. However, there are currently many candidate architectures for unicast multi-wavelength switches having wavelength conversion capabilities. Two of these architectures are easily generalized into designs for multicast switches having wavelength conversion capabilities: 1.) a non-blocking architecture based on dedicated frequency converters; and 2.) a blocking architecture based on shared frequency converters. Each of these architectures, and their shortcomings with respect to their use in multicast communications, are discussed briefly below.

An optical cross-connect with dedicated wavelength converters may be implemented by extending the architecture proposed in B. Ramamurthy et al., "Wavelength-conversion in WDM networking," IEEE Journal on Selected Areas on Communications, vol. 16, pages 1061–1073, September 1998, which is hereby incorporated by reference herein in its entirety. In such an optical cross-connect, all-optical wavelength converters are dedicated to individual channels at inputs or outputs of an optical space switch fabric. When the space switch fabric is unicast and non-blocking, the overall cross-connect becomes a unicast strictly non-blocking wavelength-interchanging cross-connect. When the space switch fabric is multicast and non-blocking, the overall cross-connect becomes a multicast strictly non-blocking wavelength-interchanging cross-connect.

The above-described cross-connect has many advantages, including its simplicity and the absence of cascaded frequency conversions. However, it suffers from large converter requirements of O(F.W), wherein F represents the required number of fibers and W represents the number of wavelengths per fiber.

An optical cross-connect with shared wavelength converters may also be implemented by extending the architecture proposed in B. Ramamurthy et al., "Wavelength-conversion in WDM networking," IEEE Journal on Selected Areas on Communications, vol. 16, pages 1061–1073, September 1998, which was previously incorporated by reference herein in its entirety. In such an optical cross-connect, a small number of all-optical wavelength converters are shared at inputs or outputs of an optical space switch fabric. Beneficially, the total number of wavelength converters may be strictly smaller than the total number of wavelength channels. However, the resulting multicast cross-connect is blocking and may not be appropriate in situations where a high level of network utilization is expected.

In view of the foregoing, it would be desirable to provide a technique for multicasting an optical frequency channel in a multi-channel optical system which overcomes the above-described inadequacies and shortcomings in an efficient and cost effective manner.

SUMMARY OF THE INVENTION

According to the present invention, a technique for multicasting an optical frequency channel in a multi-channel optical system is provided. In one particular exemplary embodiment, the technique may be realized as a method for multicasting an optical frequency channel in a multi-channel optical system. The method comprises splitting a first optical frequency channel in a pair of adjacent optical frequency channels into a first split optical frequency channel and a second split optical frequency channel. The method also comprises converting the optical frequency of the second split optical frequency channel to the optical frequency of the second optical frequency channel in the pair of adjacent optical frequency channels. The method further comprises selectively directing the first split optical frequency channel and the converted second split optical frequency channel to separate destinations.

In accordance with other aspects of this particular exemplary embodiment of the present invention, splitting the first optical frequency channel in the pair of adjacent optical frequency channels may beneficially include splitting the optical power of the first optical frequency channel in the pair of adjacent optical frequency channels. If such is the case, the method may further beneficially comprise selectively directing the first optical frequency channel in the pair of adjacent optical frequency channels to an optical power splitter.

In accordance with further aspects of this particular exemplary embodiment of the present invention, converting the optical frequency of the second split optical frequency channel may beneficially include converting the optical frequency of the second split optical frequency channel by an amount defined by $-\Delta f$, wherein $\Delta f$ is the frequency spacing between the pair of adjacent optical frequency channels. Alternatively, converting the optical frequency of the second split optical frequency channel may beneficially include converting the optical frequency of the second split optical frequency channel by an amount defined by $+\Delta f$, wherein $\Delta f$ is the frequency spacing between the pair of adjacent optical frequency channels. In either case, the multi-channel optical system may beneficially have W optical frequency channels each operating at a unique optical frequency defined by $f_i = f_0 + i\Delta f$, wherein $i = 0, \ldots, W-1$.

In another particular exemplary embodiment, the technique may be realized as an apparatus for multicasting an optical frequency channel in a multi-channel optical system. The apparatus comprises a splitter for splitting a first optical frequency channel in a pair of adjacent optical frequency channels into a first split optical frequency channel and a second split optical frequency channel. The apparatus also comprises a converter for converting the optical frequency of the second split optical frequency channel to the optical frequency of the second optical frequency channel in the pair of adjacent optical frequency channels. The apparatus further comprises a switching element for selectively directing the first split optical frequency channel and the converted second split optical frequency channel to separate destinations.

In accordance with other aspects of this particular exemplary embodiment of the present invention, the splitter may beneficially be an optical power splitter. If such is the case, the apparatus may further beneficially comprise a second switching element for selectively directing the first optical frequency channel in the pair of adjacent optical frequency channels to the optical power splitter.

In accordance with further aspects of this particular exemplary embodiment of the present invention, the converter may beneficially convert the optical frequency of the second split optical frequency channel by an amount defined by $-\Delta f$, wherein $\Delta f$ is the frequency spacing between the pair of adjacent optical frequency channels. Alternatively, the converter may beneficially convert the optical frequency of the second split optical frequency channel by an amount defined by $+\Delta f$, wherein $\Delta f$ is the frequency spacing between the pair of adjacent optical frequency channels. In either case, the multi-channel optical system may beneficially have W optical frequency channels each operating at a unique optical frequency defined by $f_i = f_0 + i\Delta f$, wherein $i = 0, \ldots, W-1$.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

An optical frequency switch may be defined as a switch for implementing permutations among a set of optical channels at distinct optical frequencies, such as incoming optical channels on a given optical waveguide. Such a switch enables the design of photonic cross-connects capable of non-blocking wavelength conversion. An example of such a switch is described in U.S. patent application Ser. No. 09/749,946, filed Dec. 29, 2000, which has previously been incorporated herein by reference.

Figure 1:
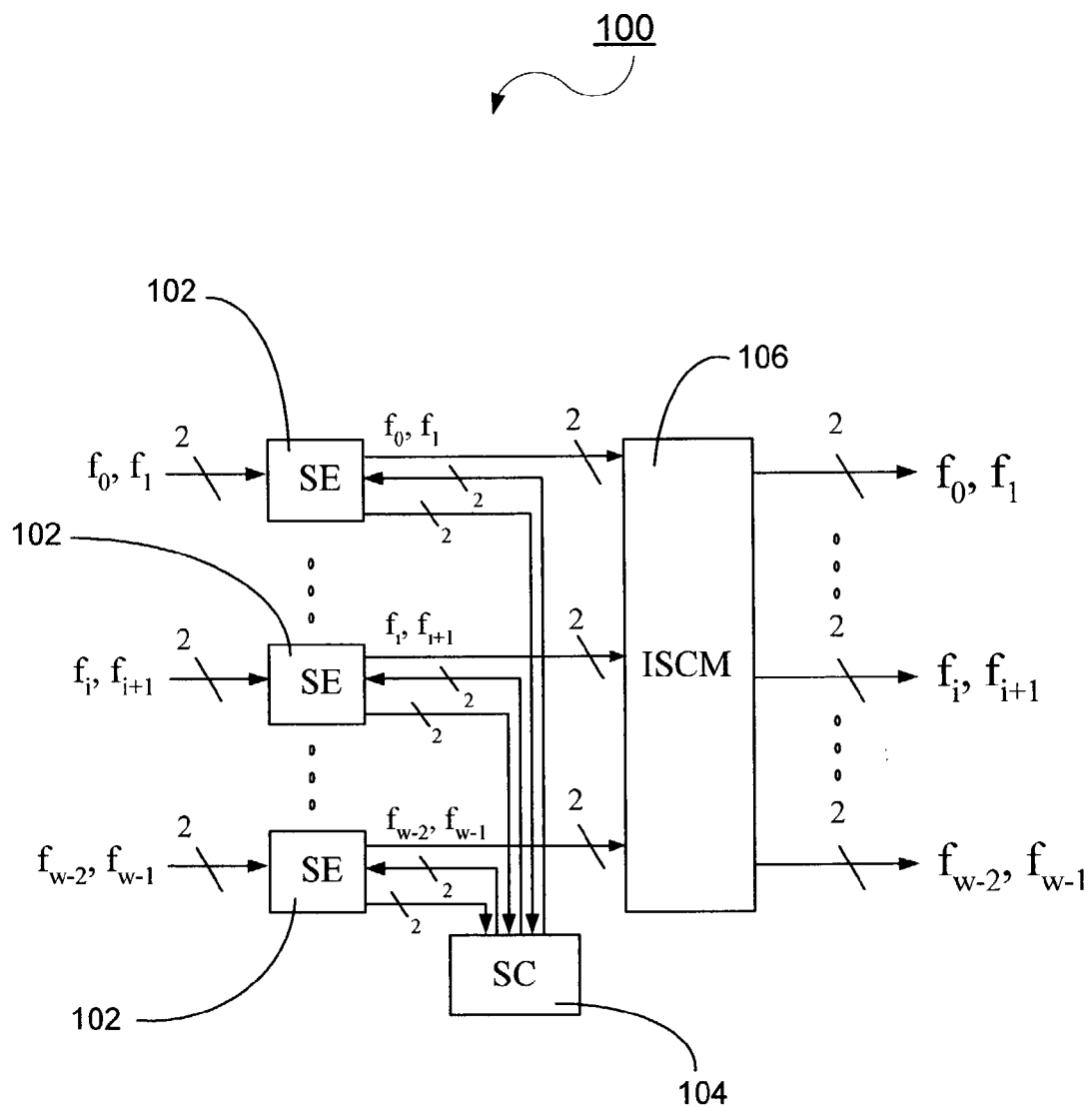
FIG. 1 shows a stage within a plane of a wave-mixing multi-log frequency switch in accordance with the present invention.

The optical frequency switch described in the above-referenced patent application uses bulk wave-mixing frequency conversion, and has a multi-log structure comprising many identical planes with many stages within each plane. The structure of a given stage within a plane of such an optical frequency switch is shown in FIG. 1. That is, FIG. 1 shows a stage 100 within a plane of a wave-mixing multi-log frequency switch operating in an optical system having W optical frequency channels each operating at a unique optical frequency defined by $f_i = f_0 + i\Delta f$, wherein $i = 0, \ldots, W-1$. The stage 100 comprises a plurality of switching elements (SE) 102, a state changer (SC) 104, and an inter-stage connection module (ISCM) 106.

In contrast to the switching elements described in the above-referenced patent application, each of the plurality of switching elements (SE) 102 shown in FIG. 1 comprises a 2×2×2 wavelength-multiplexed multicast optical space switch which, in accordance with the present invention, operates to support both unicast and multicast connections. That is, in contrast to the switching elements described in the above-referenced patent application, which contain 2×2×2 wavelength-multiplexed unicast optical space switches for supporting only unicast connections, each of the plurality of switching elements (SE) 102 shown in FIG. 1 comprises a 2×2×2 wavelength-multiplexed multicast optical space switch which, in accordance with the present invention, operates to support both unicast and multicast connections.

Each of the plurality of switching elements (SE) 102 shown in FIG. 1 operates in one of four states to support both unicast and multicast connections such that: 1.) a first two inputs serve to receive optical channels at adjacent optical frequencies from a previous switching stage; 2.) a first two outputs serve to send the optical channels at the adjacent optical frequencies received from the previous switching stage to the state changer (SC) 104 where their frequencies are converted; 3.) a second two inputs serve to receive frequency-converted optical channels at the adjacent optical frequencies from the state changer (SC) 104; and 4.) a second two outputs serve to send either frequency-converted or non-frequency-converted optical channels at the adjacent optical frequencies to a subsequent switching stage through the inter-stage connection module (ISCM) 106.

Figure 2:
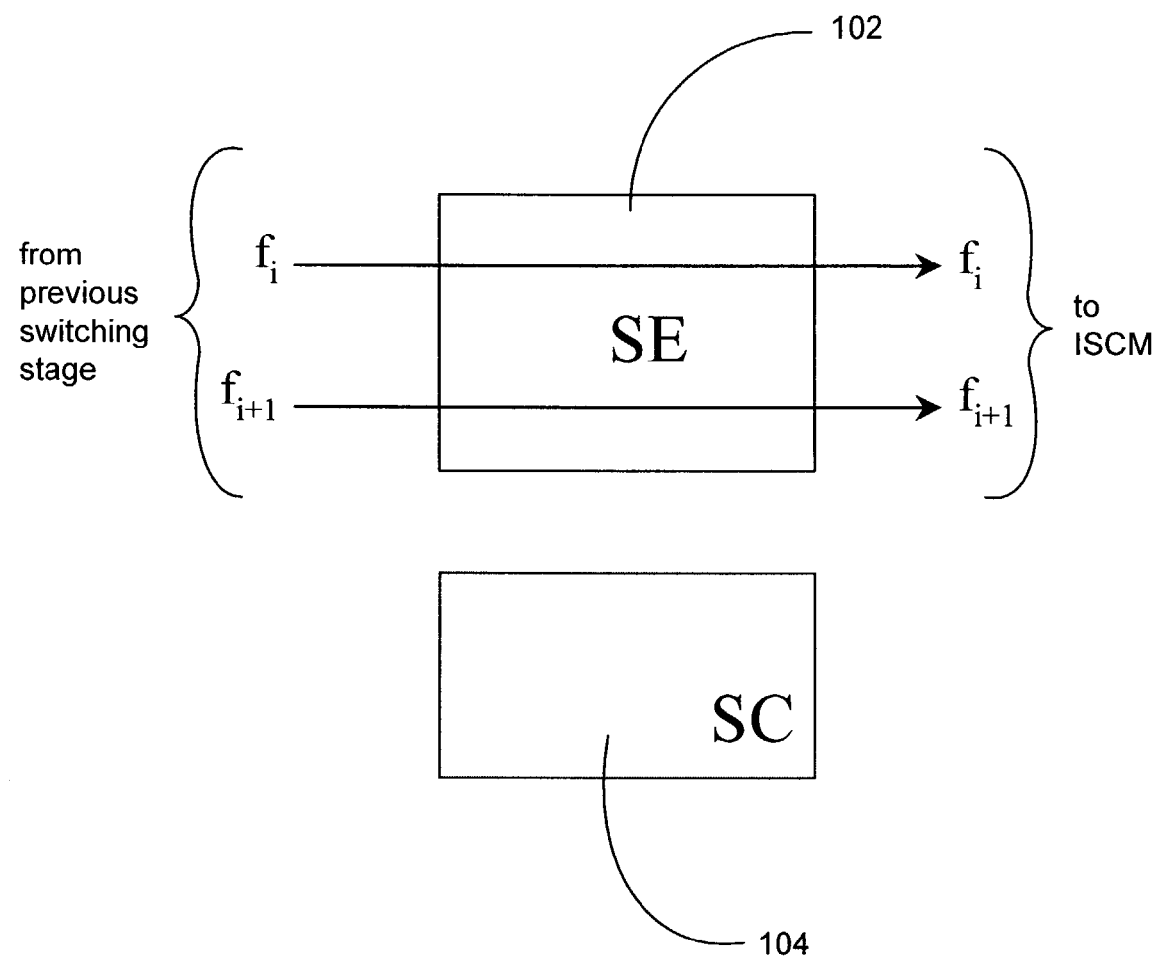
FIG. 2 shows a bar state for the switching element in the frequency switch of FIG. 1.

In a first state (i.e., a bar state), which is functionally depicted in FIG. 2, the switching element (SE) 102 receives optical channels at adjacent optical frequencies (i.e., $f_i$ and $f_{i+1}$) from a previous switching stage, and directs the optical channels to a subsequent switching stage through the inter-stage connection module (ISCM) 106. In this state, which supports unicast connections, the optical frequencies of the optical channels are not converted in any manner by the state changer (SC) 104.

Figure 3:
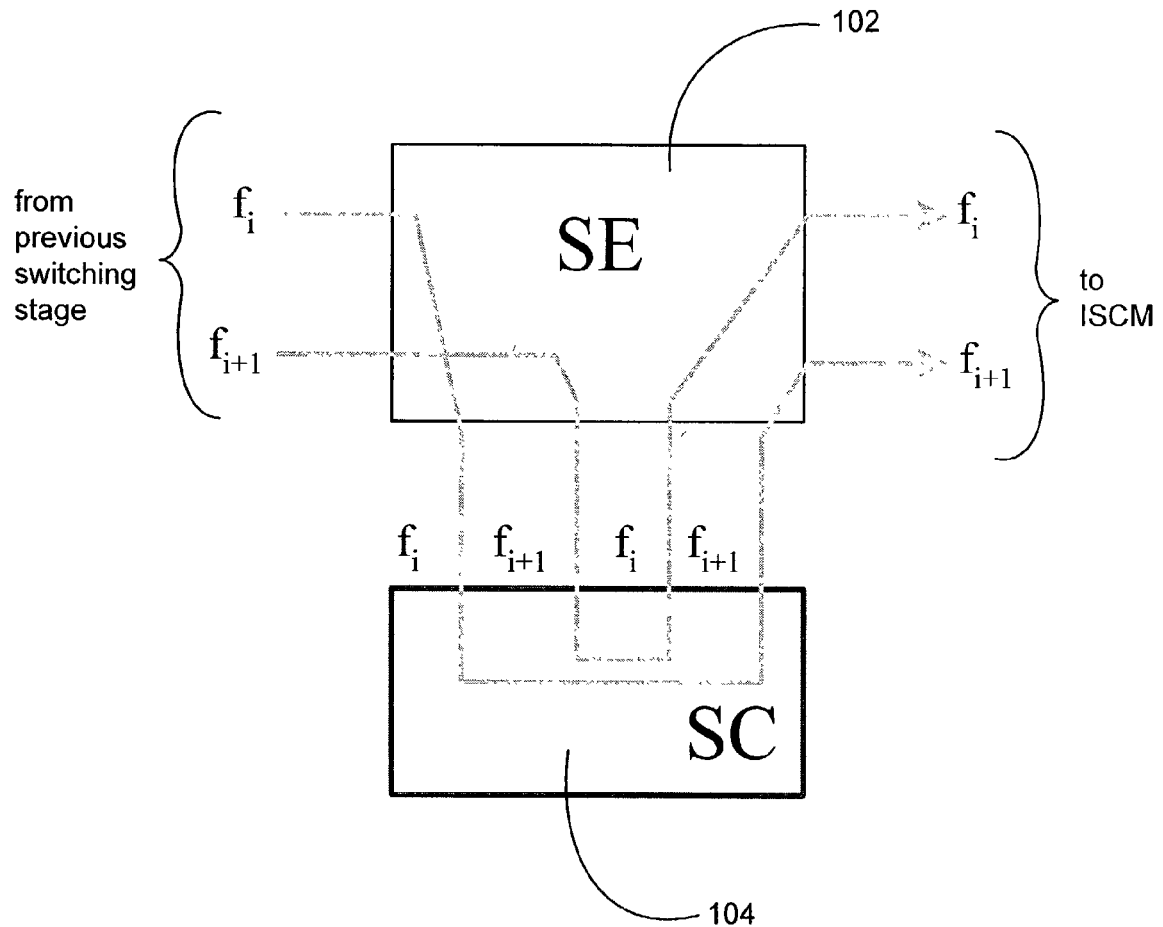
FIG. 3 shows a cross state for the switching element in the frequency switch of FIG. 1.

In a second state (i.e., a cross state), which is functionally depicted in FIG. 3, the switching element (SE) 102 receives optical channels at adjacent optical frequencies (i.e., $f_i$ and $f_{i+1}$) from a previous switching stage, and then directs the optical channels to the state changer (SC) 104. The state changer (SC) 104 receives the optical channels at adjacent optical frequencies from the switching element (SE) 102, interchangingly converts the adjacent optical frequencies of the received optical channels, and then directs the frequency-converted optical channels at the adjacent optical frequencies to the switching element (SE) 102. The switching element (SE) 102 receives the frequency-converted optical channels at the adjacent optical frequencies from state changer (SC) 104, and then directs the frequency-converted optical channels at the adjacent optical frequencies to a subsequent switching stage through the inter-stage connection module (ISCM) 106. In this state, which supports unicast connections, the optical frequencies of both of the optical channels are interchangingly converted by the state changer (SC) 104.

Figure 4:
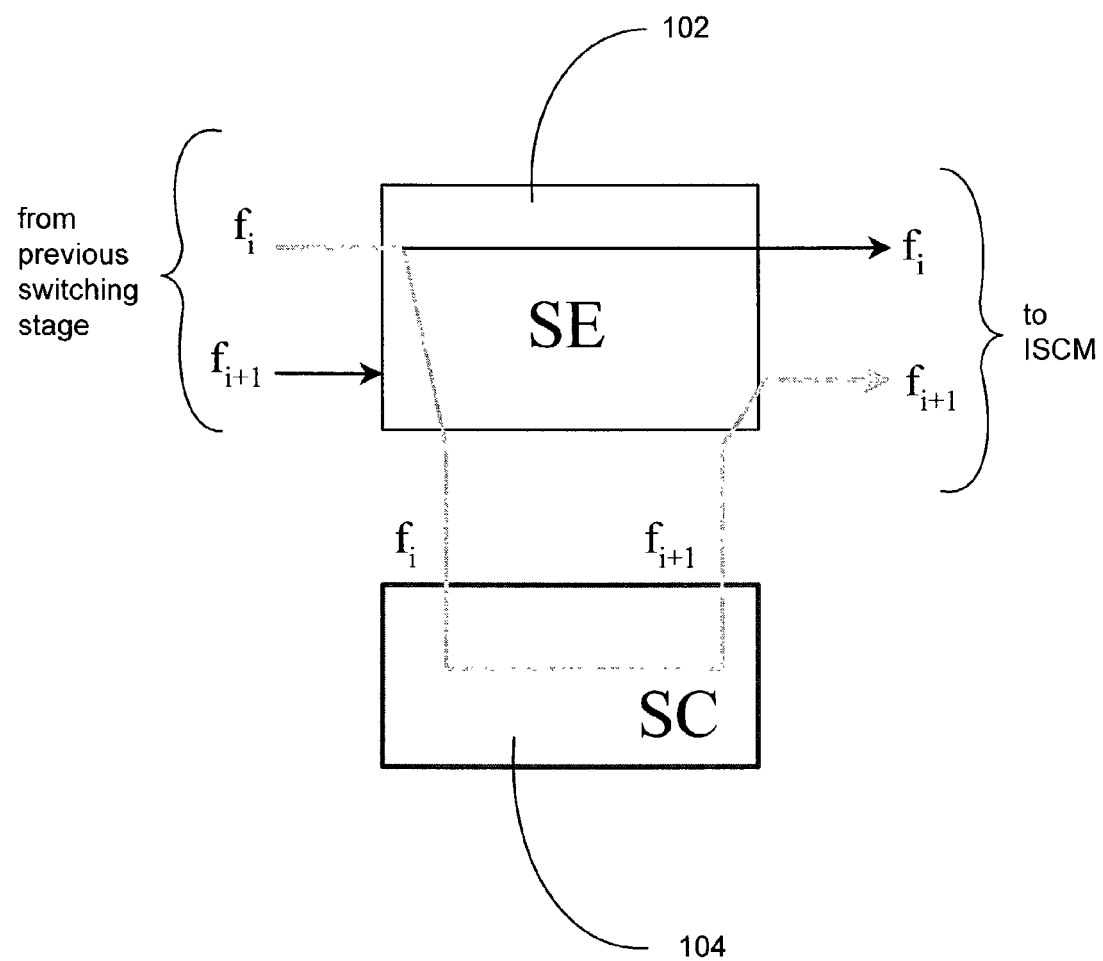
FIG. 4 shows a first broadcast state for the switching element in the frequency switch of FIG. 1.

In a third state (i.e., a first broadcast state), which is functionally depicted in FIG. 4, the switching element (SE) 102 receives optical channels at adjacent optical frequencies (i.e., $f_i$ and $f_{i+1}$) from a previous switching stage. The switching element (SE) 102 splits a first of the received optical channels (i.e., $f_i$) into two parts, and then immediately directs a first part of the split optical channel to a subsequent switching stage through the inter-stage connection module (ISCM) 106. The switching element (SE) 102 directs a second part of the split optical channel to the state changer (SC) 104. The switching element (SE) 102 does not forward a second of the received optical channels (i.e., $f_{i+1}$) to either the inter-stage connection module (ISCM) 106 or the state changer (SC) 104.

The state changer (SC) 104 receives the second part of the split optical channel from the switching element (SE) 102, converts the optical frequency of the second part of the split optical channel (i.e., $f_i$) to that of the optical frequency of the second of the received optical channels (i.e., $f_{i+1}$, which is the next highest odd frequency), and then directs the frequency-converted optical channel to the switching element (SE) 102. The switching element (SE) 102 receives the frequency-converted optical channel from state changer (SC) 104, and then directs the frequency-converted optical channel to a subsequent switching stage through the inter-stage connection module (ISCM) 106. In this state, which supports multicast connections, the optical frequency of only one of the optical channels is converted by the state changer (SC) 104.

Figure 5:
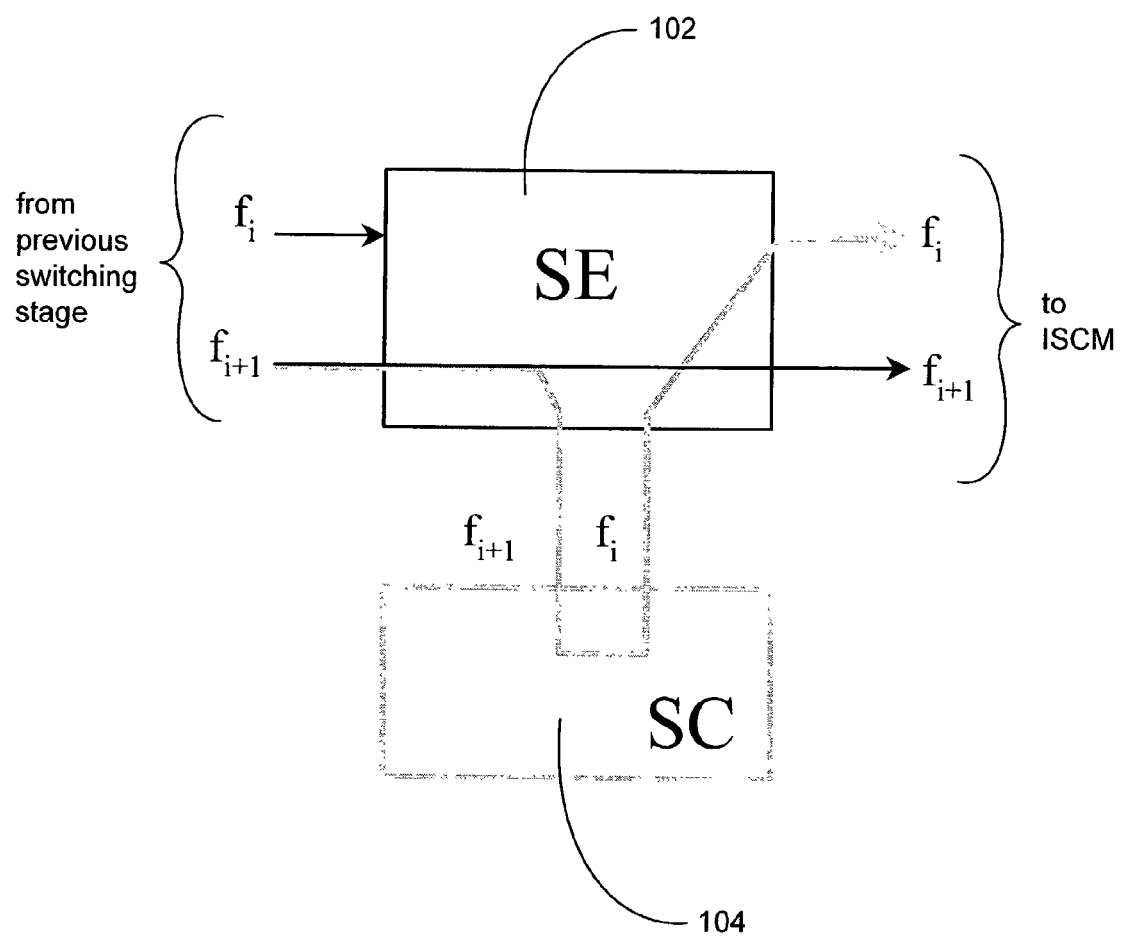
FIG. 5 shows a second broadcast state for the switching element in the frequency switch of FIG. 1.

In a fourth state (i.e., a second broadcast state), which is functionally depicted in FIG. 5, the switching element (SE) 102 receives optical channels at adjacent optical frequencies (i.e., $f_i$ and $f_{i+1}$) from a previous switching stage. The switching element (SE) 102 splits a first of the received optical channels (i.e., $f_{i+1}$) into two parts, and then immediately directs a first part of the split optical channel to a subsequent switching stage through the inter-stage connection module (ISCM) 106. The switching element (SE) 102 directs a second part of the split optical channel to the state changer (SC) 104. The switching element (SE) 102 does not forward a second of the received optical channels (i.e., $f_i$) to either the inter-stage connection module (ISCM) 106 or the state changer (SC) 104.

The state changer (SC) 104 receives the second part of the split optical channel from the switching element (SE) 102, converts the optical frequency of the second part of the split optical channel (i.e., $f_{i+1}$) to that of the optical frequency of the second of the received optical channels (i.e., $f_i$, which is the previous even frequency), and then directs the frequency-converted optical channel to the switching element (SE) 102. The switching element (SE) 102 receives the frequency-converted optical channel from state changer (SC) 104, and then directs the frequency-converted optical channel to a subsequent switching stage through the inter-stage connection module (ISCM) 106. In this state, which supports multicast connections, the optical frequency of only one of the optical channels is converted by the state changer (SC) 104.

Figure 6:
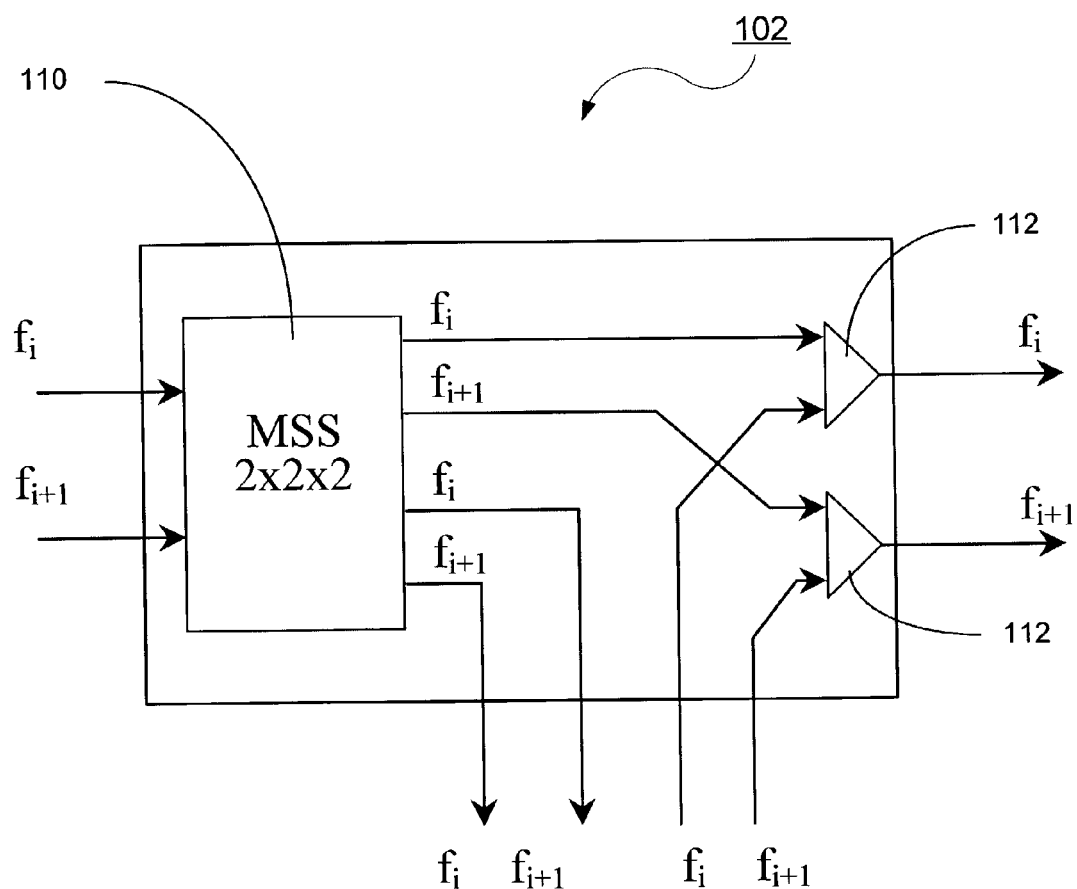
FIG. 6 shows a detailed schematic diagram of an exemplary embodiment of the switching element in the frequency switch of FIG. 1.

Referring to FIG. 6, there is shown a detailed schematic diagram of an exemplary embodiment of the switching element (SE) 102. As shown in FIG. 6, the switching element (SE) 102 comprises a 2×2×2 wavelength-multiplexed multicast optical space switch (MSS) 110 which, in accordance with the present invention, operates to support both unicast and multicast connections. The switching element (SE) 102 also comprises a pair of optical couplers 112 for directing one of two optical channels from the switching element (SE) 102 to the inter-stage connection module (ISCM) 106.

Figure 7:
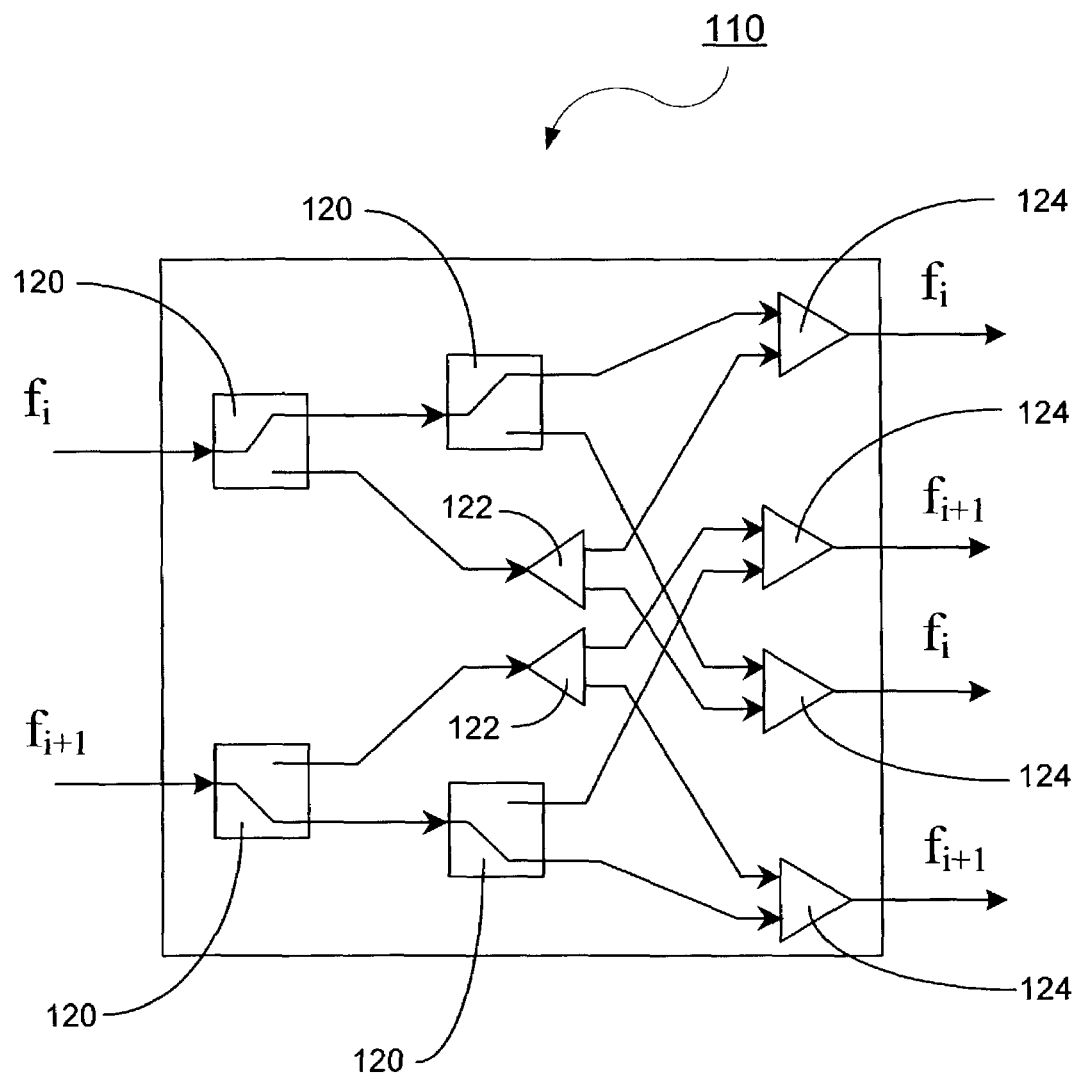
FIG. 7 shows a detailed schematic diagram of an exemplary embodiment of the 2×2×2 wavelength-multiplexed multicast optical space switch in the switching element of FIG. 6.

Referring to FIG. 7, there is shown a detailed schematic diagram of an exemplary embodiment of the 2×2×2 wavelength-multiplexed multicast optical space switch (MSS) 110. As shown in FIG. 7, the 2×2×2 wavelength-multiplexed multicast optical space switch (MSS) 110 comprises a plurality of 1×2 optical selector switches 120, a pair of optical power splitters 122, and a plurality of optical power combiners 124. Each of these elements operates to support both unicast and multicast connections as described above.

Referring again to FIGS. 1–5, the state changer (SC) 104 operates to receive optical channels from the switching element (SE) 102, perform fixed frequency conversions on the received optical channels, and then direct the frequency-converted optical channels to the switching element (SE) 102. The state changer (SC) 104 provides the fixed frequency conversions by mapping each even frequency to a next highest odd frequency, and each odd frequency to a previous even frequency. As described in the above-referenced patent application, the state changer (SC) 104 may be constructed with static wavelength routers, and wave-mixing bulk frequency translation devices for providing frequency shifts of $-\Delta f$ and $+\Delta f$.

The inter-stage connection module (ISCM) 106 operates to receive optical channels from the switching element (SE) 102, and then perform fixed inter-stage permutations in the frequency domain. These fixed inter-stage permutations are specific to multi-log networks, such as, for example, butterfly, shuffle, or inverse shuffle permutations. As described in the above-referenced patent application, a butterfly inter-stage connection module may implement static wavelength routing and wavelength-selective optical frequency translations in the form of $\pm(2^h-1)\Delta f$, where $h=1, \ldots, (\log_2 W-1)$, with a constant number of bulk wave-mixing frequency translation devices. As also described in the above-referenced patent application, a shuffle or inverse shuffle inter-stage connection module may be implemented with $O(\log_2 W)$ bulk wave-mixing frequency translation devices providing frequency translations in the form of $\pm(2^h-1)\Delta f$, where $h=1, \ldots, (\log_2 W-1)$.

In summary, the present invention provides a novel design technique for multicast frequency switches, where input optical channels occupy distinct optical frequencies, and a given input optical channel may be broadcast to on multiple output optical channels at distinct optical frequencies. The design technique is an extension of a previously disclosed architecture for non-blocking frequency switches, which have the capability to realize any permutation among a set of input optical channels at distinct optical frequencies. In the novel design technique, switching elements are organized into planes, wherein each plane has $O(\log_2 W)$ stages, and wherein W is a number of distinct optical frequencies. The required frequency conversions can be provided in a cost-effective way with a constant number of wave-mixing bulk frequency converters per stage and per plane.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for multicasting an optical frequency channel in a multi-channel optical system, the method comprising the steps of:
    splitting a first optical frequency channel in a pair of adjacent optical frequency channels into a first split optical frequency channel and a second split optical frequency channel;
    converting the optical frequency of the second split optical frequency channel to the optical frequency of the second optical frequency channel in the pair of adjacent optical frequency channels; and
    selectively directing the first split optical frequency channel and the converted second split optical frequency channel to separate destinations.

2. The method as defined in claim 1, wherein the step of splitting the first optical frequency channel in the pair of adjacent optical frequency channels includes splitting the optical power of the first optical frequency channel in the pair of adjacent optical frequency channels.

3. The method as defined in claim 2, further comprising the step of:
    selectively directing the first optical frequency channel in the pair of adjacent optical frequency channels to an optical power splitter.

4. The method as defined in claim 1, wherein the step of converting the optical frequency of the second split optical frequency channel includes converting the optical frequency of the second split optical frequency channel by an amount defined by $-\Delta f$, wherein $\Delta f$ is the frequency spacing between the pair of adjacent optical frequency channels.

5. The method as defined in claim 4, wherein the multi-channel optical system has W optical frequency channels each operating at a unique optical frequency defined by $f_i = f_0 + i\Delta f$, wherein $i=0, \ldots, W-1$.

6. The method as defined in claim 1, wherein the step of converting the optical frequency of the second split optical frequency channel includes converting the optical frequency of the second split optical frequency channel by an amount defined by $+\Delta f$, wherein $\Delta f$ is the frequency spacing between the pair of adjacent optical frequency channels.

7. The method as defined in claim 6, wherein the multi-channel optical system has W optical frequency channels each operating at a unique optical frequency defined by $f_i = f_0 + i\Delta f$, wherein $i=0, \ldots, W-1$.

8. An apparatus for multicasting an optical frequency channel in a multi-channel optical system, the apparatus comprising:
    a splitter for splitting a first optical frequency channel in a pair of adjacent optical frequency channels into a first split optical frequency channel and a second split optical frequency channel;
    a converter for converting the optical frequency of the second split optical frequency channel to the optical frequency of the second optical frequency channel in the pair of adjacent optical frequency channels; and
    a switching element for selectively directing the first split optical frequency channel and the converted second split optical frequency channel to separate destinations.

9. The apparatus as defined in claim 8, wherein the splitter is an optical power splitter.

10. The apparatus as defined in claim 9, further comprising:
    a second switching element for selectively directing the first optical frequency channel in the pair of adjacent optical frequency channels to the optical power splitter.

11. The apparatus as defined in claim 8, wherein the converter converts the optical frequency of the second split optical frequency channel by an amount defined by $-\Delta f$, wherein $\Delta f$ is the frequency spacing between the pair of adjacent optical frequency channels.

12. The apparatus as defined in claim 11, wherein the multi-channel optical system has W optical frequency channels each operating at a unique optical frequency defined by $f_i = f_0 + i\Delta f$, wherein $i=0, \ldots, W-1$.

13. The apparatus as defined in claim 8, wherein the converter converts the optical frequency of the second split optical frequency channel by an amount defined by $+\Delta f$, wherein $\Delta f$ is the frequency spacing between the pair of adjacent optical frequency channels.

14. The apparatus as defined in claim 13, wherein the multi-channel optical system has W optical frequency channels each operating at a unique optical frequency defined by $f_i = f_0 + i\Delta f$, wherein $i=0, \ldots, W-1$.

* * * * *